Dec. 11, 1934. W. D. HARRISON 1,983,799
BRUSH RIGGING
Filed Feb. 23, 1932
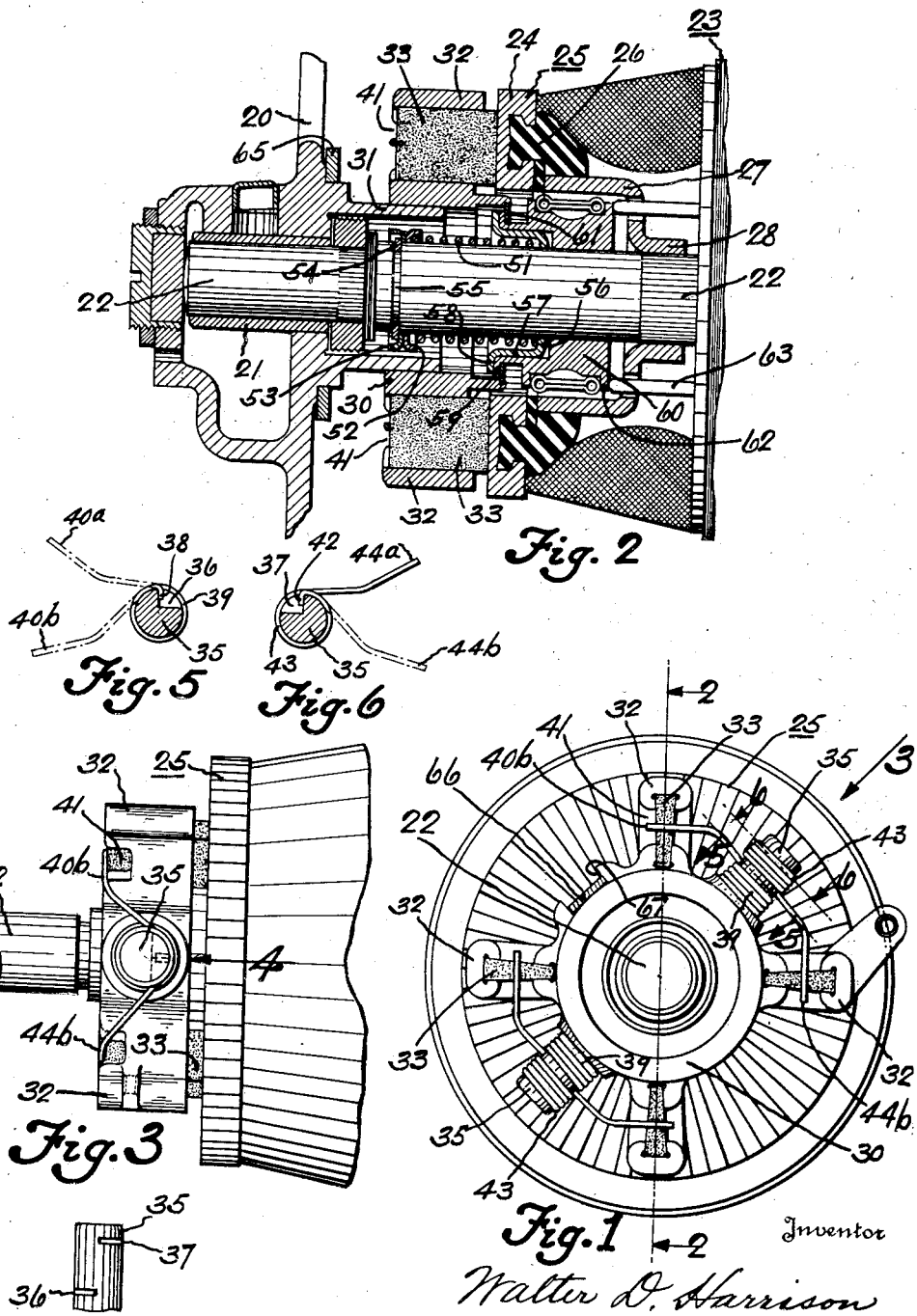

Patented Dec. 11, 1934

1,983,799

UNITED STATES PATENT OFFICE 1,983,799

BRUSH RIGGING

Walter D. Harrison, Dayton, Ohio, assignor, by mesne assignments, to General Motors Corporation, Detroit, Mich., a corporation of Delaware Application February 23, 1932, Serial No. 594,645

1 Claim. (Cl. 171—324)

This invention relates to brush rigging for dynamo-electric machines, and more particularly to machines having annular rows of radially extending commutator segments which present a plane annular surface to the brushes.

It is an object of the present invention to provide means for causing the brushes to bear with substantially equal pressure upon the commutator.

Further objects and advantages of the present invention will be apparent from the following description, reference being had to the accompanying drawing wherein a preferred embodiment of one form of the present invention is clearly shown.

In the drawing:

Fig. 1 is an end view of a shaft carrying a commutator cooperating with a brush rigging embodying the present invention;

Fig. 2 is a sectional view on the line 2—2 of Fig. 1;

Fig. 3 is a fragmentary view looking in the direction of the arrow 3 of Figure 1;

Fig. 4 is a fragmentary view of a spring supporting stud looking in the direction of the arrow 4 of Fig. 3; and Figs. 5 and 6 are fragmentary sectional views taken respectively on the lines 5—5 and 6—6 of Fig. 1.

Referring to the Figs. 1 and 2, 20 designates an end frame of a dynamo electric machine supporting one of the bearings 21 for an armature shaft 22 which carries the rotor 23 comprising windings having their leads joined to segments 24 of a commutator 25. Commutator 25 includes a body of molded material 26 in which the segments 24 are embedded and by which the segments are joined to a sleeve 27 having a hub 28 connected with the shaft 22.

The novel brush rigging comprises a sleeve or rub 30 which is slidably mounted on a tubular extension 31 of the end frame 20 concentric with the shaft 22. The hub 30 carries a plurality of radially arranged box-type brush holders 32, each guiding a brush 33 for longitudinal movement relative to the commutator 25. These box-type brush holders 32 may be described as being arranged in pairs. Between each pair of brush holders 32 is located a stud or spring post 35 integral with the sleeve 30 and extending radially therefrom.

Referring to Fig. 4, each stud 35 is provided with notches 36 and 37, shown in section in Figs. 5 and 6 respectively. The notch 36 receives an inturned end portion 38 of a spring 39 whose intermediate portion is coiled around the stud 35 and whose free end portion is normally in position 40a with respect to the end 38, as viewed in Fig. 5. However, when the spring 39 is installed, as shown in the drawing, the free end is located in the position 40b in Fig. 5 designating the position when the brush 33 is new. Obviously as the brush wears away the spring end 40 will move toward the commutator 25 and into a clearance notch 41 provided in those brush holders 32 carrying the brushes which cooperate with that spring end 40. Likewise the notch 37 of the stud 35 receives the inturned end 42 of a spring 43 whose intermediate portion is coiled around the stud 35 and whose free end 44 is normally located in the position 44a, shown in Fig. 6. 44b indicates the position of the free end 40 when this free end bears against a new brush.

The brush rigging support including the hub 30, the box-type brush holder 32 and the studs 35 are formed preferably integrally by die-casting. The notches 36 and 37 are formed in the casting operation. The two springs 39 and 43 are substantially alike except for the fact that their respective free ends are bent in opposite directions with respect to the axis of the coiled part of the spring. Therefore, up to a certain point in the process of making these springs, these springs are duplicate parts. The springs are assembled upon the studs 35 simply by springing out the inturned ends 38 and 42, permitting them to be snapped into the notches 36 and 37, respectively, when the spring has been properly located upon the stud 35. Each inturned spring end in combination with the walls bounding the notch, which receives it provides a common means for preventing rotary and axial movement of the spring end relative to the spring post.

It will be noted that the two springs 39 and 43 are located upon the stud so that the spring arms 40 and 44 extend substantially from the same point with respect to the axis of the stud 35 and the ends of the springs bear against brushes 33 at points substantially the same distance from the axis of the stud 35. Since the springs are substantially alike, being duplicate parts up to the last step in making them, the present invention provides a construction which can be manufactured with utmost economy and which will result in the application of substantially uniform pressure to the brushes.

The hub 30 is slidable on a tubular boss 31 integral with frame 20 and is urged toward the commutator 25 by a spring 51 bearing at one end against a cupped washer 52 retained by a second cupped washer 53 held by a resilient C-washer 54 located in groove 55 of shaft 22. The other end of the spring 51 bears against a flange 56 of a sleeve 57 whose outer flanges 58 bear against a flange 59 of a sleeve 60 which is slidable on shaft 22. The flange 59 of sleeve 60 bears against a ring 61 attached to the hub 30. The sleeve 60 carries a commutator short circuiting band 62 and is moved toward the left by rods 63 actuated by a centrifugal device not shown. Rotation of the hub 30 is prevented by a plate 65 attached to the end frame 20 and having a lug 66 extending parallel to the shaft 22 and received by a notch 67 in the hub 30.

While the form of embodiment of the present invention as herein disclosed, constitutes a preferred form, it is to be understood that other forms might be adopted, all coming within the scope of the claim which follows.

What is claimed is as follows:

A brush rigging for plane, annular commutators comprising, in combination, a hub member by which the rigging is mounted, at least one pair of box-type brush holders extending radially therefrom and adapted to support brushes for movement toward said commutator, a post extending radially from said hub and located midway between the brush holders of a pair, and a pair of similar coil springs having their coiled portion mounted on the post and each having an inturned end received by an arcuate notch in the post and a free arm extending adjacent a brush holder to urge a brush therein toward the commutator, the arcuate notches in the post being so spaced apart that the springs can be located upon the post with their free arms adjacent and their inturned ends remote from each other, whereby the operative length of the two free spring arms are substantially equal.

WALTER D. HARRISON.